US012413800B2

United States Patent
Younan et al.

(10) Patent No.: US 12,413,800 B2
(45) Date of Patent: Sep. 9, 2025

(54) ADAPTIVE DIGITAL CONTENT PREPROCESSING BASED ON BITRATE

(71) Applicant: ATI Technologies ULC, Markham (CA)

(72) Inventors: Marvin Younan, Maple (CA); Ihab Amer, Stouffville (CA); Feng Pan, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 281 days.

(21) Appl. No.: 17/845,377

(22) Filed: Jun. 21, 2022

(65) Prior Publication Data

US 2023/0412864 A1     Dec. 21, 2023

(51) Int. Cl.
*H04N 21/2662* (2011.01)
*H04N 19/117* (2014.01)
*H04N 19/136* (2014.01)
*H04N 21/24* (2011.01)

(52) U.S. Cl.
CPC ....... *H04N 21/2662* (2013.01); *H04N 19/117* (2014.11); *H04N 19/136* (2014.11); *H04N 21/2402* (2013.01)

(58) Field of Classification Search
CPC .................................................. H04N 21/2662
See application file for complete search history.

(56) References Cited

PUBLICATIONS

Karunaratne, Passant V, et al., "A Rate-Distortion Optimal Video Pre-Processing Algorithm", Proceedings 2001 International Conference on Image Processing (Cat. No. 01CH37205) [retrieved May 5, 2022]. Retrieved <https://doi.org/10.1109/ICIP.2001.959058>., Oct. 2001, 4 pages.

*Primary Examiner* — Y Lee
(74) *Attorney, Agent, or Firm* — FIG. 1 Patents (57) ABSTRACT

Adaptive digital content preprocessing techniques based on a bitrate are described. In an implementation, a parameter of a preprocessing module is set based on a target bitrate. The parameter specifies an amount of preprocessing to be performed in preprocessing digital content. Preprocessed digital content is generated by preprocessing the digital content by the specified amount using the preprocessing module. Encoded digital content is generated by compressing the preprocessed digital content using a compression technique by an encoder. The encoded digital content is then transmitted for communication at the target bitrate.

20 Claims, 6 Drawing Sheets

ADAPTIVE DIGITAL CONTENT PREPROCESSING BASED ON BITRATE

BACKGROUND

A variety of types of digital content are communicated between entities in a range of usage scenarios. A digital content source, for instance, includes an encoder that encodes the digital content for receipt by a digital content sink which consumes the digital content, e.g., using a decoder. This supports a variety of different usage scenarios, such as to communicate the digital content over a network, render the digital content, store the digital content, and so forth. In one such scenario, encoding of the digital content includes use of one or more compression techniques, which is usable to reduce an amount of data involved in communicating or storing the digital content. However, conventional preprocessing techniques can have an adverse effect on encoding accuracy, thereby hindering operation of encoders and underlying hardware functionality.

BRIEF DESCRIPTION OF THE DRAWINGS

The detailed description is described with reference to the accompanying figures.

DETAILED DESCRIPTION

Encoding and subsequent decoding of digital content is employed in a variety of usage scenarios, including communication of the digital content, storage of the digital content, rendering of digital content, and so forth. Digital content is configurable in a variety of ways, examples of which include digital video, digital audio, digital media, digital documents, and so forth.

In a conventional digital video example, the encoder compresses a digital video sequence of frames and audio as a bitstream. As part of this, preprocessing techniques are also employed to filter noise from the digital video sequence before compressing the digital video, typically in an attempt to improve compression quality. This is performed, for instance, to reduce complexity of frames of the digital video thereby improving an ability of an encoder to subsequently compress the frames. In practice using conventional techniques, however, this has come at a cost of blurring defined features of objects depicted in the frames, e.g., at edges and corners of the objects.

To solve these problems, adaptive digital content processing techniques are described that are based, at least in part, on a corresponding target bitrate that is to be used to communicate the digital content. As part of this, parameters used to control preprocessing of the digital content are adjusted based on a target bitrate such that changes to the target bitrate are used as a basis to adjust amounts of preprocessing performed on the digital content before encoding, e.g., compression. As a result, these techniques support noticeable increases in quality after encoding in comparison to conventional fixed techniques. A variety of other instances are also contemplated, examples of which are described in the following discussion and shown using corresponding figures.

In some aspects, the techniques described herein relate to a method including: setting a parameter of a preprocessing module based on a target bitrate, the parameter specifying an amount of preprocessing to be performed in preprocessing digital content; generating preprocessed digital content by preprocessing the digital content by the specified amount using the parameter by the preprocessing module; generating encoded digital content by compressing the preprocessed digital content using a compression technique by an encoder; and transmitting the encoded digital content for communication at the target bitrate.

In some aspects, the techniques described herein relate to a method, wherein the setting of the parameter adapts the amount of preprocessing responsive to a change in the target bitrate.

In some aspects, the techniques described herein relate to a method, wherein the change to the target bitrate is caused based on detecting a change to a communication condition.

In some aspects, the techniques described herein relate to a method, wherein the preprocessing includes filtering the digital content and the parameter specifies a filtering strength of the filtering.

In some aspects, the techniques described herein relate to a method, wherein the filtering includes use of Gaussian filtering, low pass filters, low pass filter, edge preserving low pass filter, or perceptual low pass filter.

In some aspects, the techniques described herein relate to a method, wherein the filtering includes removing noise from the digital content.

In some aspects, the techniques described herein relate to a method, wherein the preprocessing includes edge detection in the digital content and the parameter specifies a number of edges.

In some aspects, the techniques described herein relate to a method, wherein the preprocessing includes image resizing and scene change detection.

In some aspects, the techniques described herein relate to a method, wherein the digital content includes a plurality of digital images as part of a digital video.

In some aspects, the techniques described herein relate to a method, wherein the digital content includes digital audio.

In some aspects, the techniques described herein relate to a method, further including: determining the bitrate based a communication condition; and calculating the parameter setting based on the bitrate.

In some aspects, the techniques described herein relate to a method, wherein the communication condition includes available bandwidth or noise.

In some aspects, the techniques described herein relate to a system including: a preprocessing module to filter frames of a digital video by an amount that adapts to changes in a target bitrate for communication of the digital video; and an encoder to encode the filtered frames of the digital video.

In some aspects, the techniques described herein relate to a system, wherein the changes in the target bitrate are determined responsive to changes in a communication condition.

In some aspects, the techniques described herein relate to a system, wherein the communication condition includes available bandwidth or noise.

In some aspects, the techniques described herein relate to a system, wherein the amount of filtering is decreased responsive to increases in the target bitrate.

In some aspects, the techniques described herein relate to a system, wherein the preprocessing module and the encoder are implemented in hardware.

In some aspects, the techniques described herein relate to a system, wherein the preprocessing module is configured to filter the frames as part of noise removal or edge detection.

In some aspects, the techniques described herein relate to a system including: a preprocessing module implemented in hardware to adaptively change an amount of preprocessing performed on digital content based on a change in a target bitrate for communication of the digital content; and an encoder implemented in hardware to encode the preprocessed digital content.

In some aspects, the techniques described herein relate to a system, wherein the preprocessing module and the encoder are implemented in hardware of a parallel accelerated processor and the digital content is received as an input from a central processing unit.

In some aspects, the techniques described herein relate to a method including: detecting a first communication condition; determining a first target bitrate based on the first communication condition; setting a parameter of a preprocessing module by a first amount based on the first target bitrate; generating first preprocessed digital content by preprocessing digital content by the first amount using the preprocessing module; generating first encoded digital content by encoding the first preprocessed digital content using a compression technique by an encoder; detecting a second communication condition that is subsequent to and different from the first communication condition; determining a second target bitrate based on the second communication condition; setting the parameter of the preprocessing module by a second amount based on the second target bitrate; generating second preprocessed digital content by preprocessing digital content by the second amount using the preprocessing module; generating second encoded digital content by encoding the second preprocessed digital content using a compression technique by the encoder.

Figure 1:
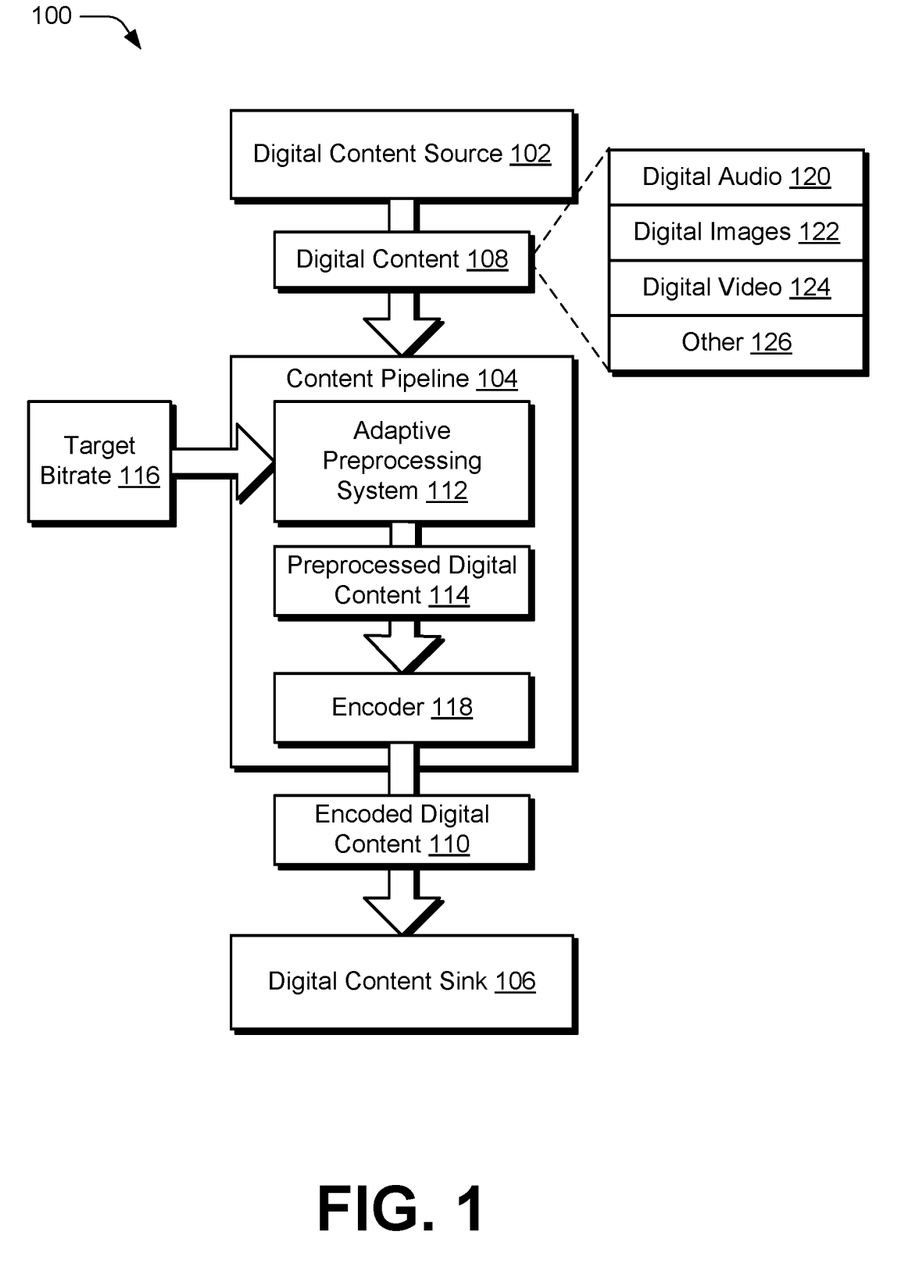
FIG. 1 is a block diagram of a non-limiting example system configured to employ adaptive digital content preprocessing based on bitrate.

FIG. 1 is a block diagram of a non-limiting example system 100 configured to employ adaptive digital content preprocessing based on bitrate. The system 100 includes a digital content source 102, a content pipeline 104, and a digital content sink 106. The digital content source 102 and content pipeline 104, for instance, correspond to a producer that is communicatively coupled to a consumer that includes the digital content sink 106. As such, the digital content source 102 and content pipeline 104 are representative of a source of encoded digital content and the digital content sink 106 is representative of a destination that is configured to decode and consume the encoded digital content.

The digital content source 102, content pipeline 104, and digital content sink 106 are configurable using a variety of devices to interface with each other, e.g., via a communication link over a network, locally within a single device, and so forth. Examples of those devices include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the digital content source 102, content pipeline 104, and digital content sink 106 are configured as any one or more of those devices listed just above and/or a variety of other devices without departing from the spirit or scope of the described techniques.

The content pipeline 104 receives digital content 108 from the digital content source 102 as an input and outputs encoded digital content 110 for receipt by the digital content sink 106. In order to generate the encoded digital content 110, the content pipeline 104 includes an adaptive preprocessing system 112 to generate preprocessed digital content 114 that is then encoded by the encoder 118 to form the encoded digital content 110. As part of this, the adaptive preprocessing system 112 is configured to adjust an amount of preprocessing performed based on a target bitrate 116, such as to decrease an amount of preprocessing performed responsive to increases in a target bitrate 116 and vice versa. In this way, the techniques described herein support noticeable increases in quality in the encoded digital content 110 over conventional techniques, thereby improving operation of underlying devices that implement the adaptive digital content processing techniques described herein. These techniques are applicable to a wide variety of digital content 108 configurations, examples of which include digital audio 120, digital images 122, digital video 124, and other 126 forms of digital content such as digital documents.

As previously described, although filtering has been employed in some conventional examples as part of preprocessing to improve compression quality, the corresponding reduction in complexity in the digital content has resulted in a corresponding lack in accuracy in the digital content. In a digital video, for instance, blurring has been observed at defined features along edges and corners of objects in digital images in which noise filtering is employed as part of preprocessing before compression is undertaken by an encoder. Accordingly, in the techniques described herein the adaptive preprocessing system 112 is configured to adjust an amount of preprocessing based on a target bitrate 116. Further, this adjustment is also performable dynamically as changes are detected in the target bitrate 116, which is not performable in conventional fixed techniques. As such, these techniques are configurable to preserve details at higher target bitrates and improve encoding efficiency through increased preprocessing at lower target bitrates.

Consider a scenario in which a sequence of frames of a digital video are encoded over several bitrates. Each bitstream produced is subsequently decoded and a reconstructed video sequence is created. Each reconstructed video sequence is then compared to an input video sequence via a distortion metric and ordered pairs of {bitrate, distortion metric} are used to plot a rate distortion curve.

Also, suppose that the same video sequence is preprocessed using a noise filter and the filtered video sequence is compared to the source video sequence via a quality metric. The resultant quality metric is a function of the filtering parameters. An increase to the strength of the filter, for instance, blurs the video sequence and therefore results in a lower quality metric value that exhibits a relatively large difference between input and output video sequences. If the filter parameters do not change with bitrate, the quality metric is constant across each of the bitrates and is referred to as a constant filtering curve in the following discussion.

In practice, the constant filtering curve places itself above the rate distortion curve because filtering does not alter the source video sequence in an amount that is greater than amount the source video sequence is altered via compression. In the constant filtering curve as encountered in conventional techniques, low and high bitrate use cases are treated the same. Consequently, fewer details are preserved at lower bitrates after compression and thus benefit from stronger filtering. In conventional techniques, filter parameters are tuned to achieve compressibility at low bitrates. However, in conventional techniques the filter parameters are not adaptive to the bitrate, and thus this change also applies to relatively high bitrates having a relatively greater amount of pronounced details. This results in a quality degradation due to excess filtering.

To address these challenges, the adaptive preprocessing system 112 is configurable in this example to gradually decrease the filtering strength as the bitrate increases and vice versa, which is referred to in the following discussion as an adaptive filter curve. To compare compression quality between the two filtering techniques, each filter (i.e., constant and adaptive) is placed before the encoder and two sets of bitstreams are created. The reference set of bitstreams (constant filtering+encoding) is compared to a test set of bitstreams (adaptive filtering+encoding) and rate distortion statistics are calculated. It has been identified through the techniques described herein that the adaptive filter provides bitrate savings across each of the quality metrics. Further, it has also been observed that at high bitrates the constant filtering approach is susceptible to over filtering and a general degradation of quality as described above. Accordingly, the adaptive preprocessing system 112 is configured to adjust preprocessing parameters and therefore an amount of preprocessing performed based on a target bitrate 116. The adaptive preprocessing system 112, for instance, employs greater amounts of noise filtering at low bitrates where the details are less pronounced and gradually decreases the filtering strength as the bitrate increases, thereby resulting in an improvement in objective and subjective quality at higher bitrates.

Figure 2:
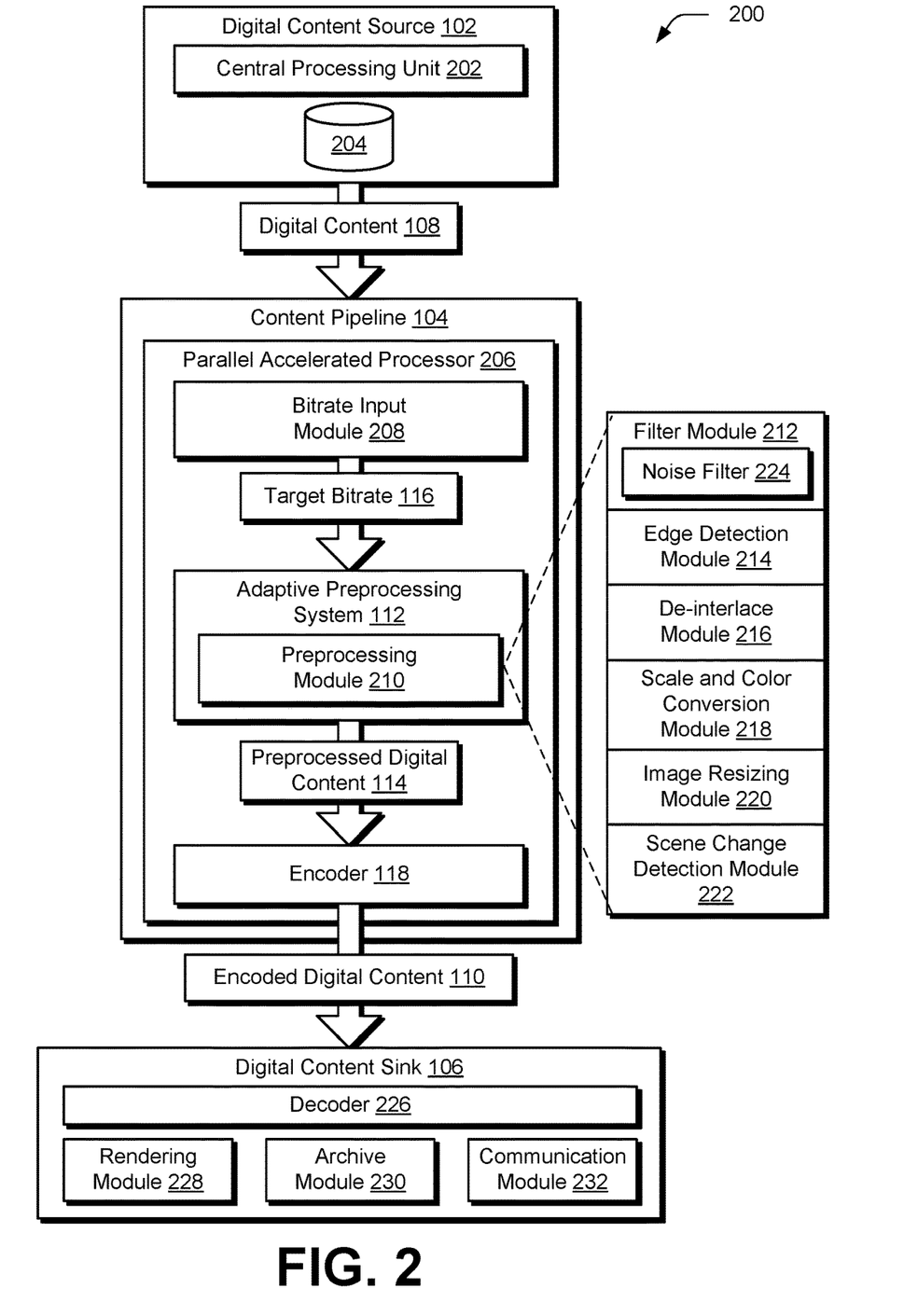
FIG. 2 depicts a non-limiting example showing operation of a digital content source, content pipeline, and digital content sink of FIG. 1 in greater detail.

FIG. 2 depicts a non-limiting example 200 showing operation of the digital content source 102, content pipeline 104, and digital content sink 106 in greater detail. The digital content source 102 is representative of a source of digital content 108, examples of which include a central processing unit (CPU) 202 (e.g., involving an application executed by the CPU), a storage device 204, and a variety of other configurations including a network connection device.

The content pipeline 104 is illustrated in this example as implemented using a parallel accelerated processor 206, e.g., a graphics processing unit. A bitrate input module 208 is configured to receive an input specifying a target bitrate 116. The target bitrate 116, for instance, is specified based on network conditions of a network connection between a producer implemented the digital content source 102 and the content pipeline 104 and a consumer implementing the digital content sink 106. In an implementation, the target bitrate 116 changes dynamically responsive to changes in the network conditions, e.g., as the digital content 108 is to be streamed. Other instances are also contemplated, such as an input specifying an amount of encoding (e.g., compression) to be used to store the digital content 108, render the digital content 108, and so on.

The target bitrate 116 is received as an input by the adaptive preprocessing system 112. The adaptive preprocessing system 112 includes a preprocessing module 210 that is representative of preprocessing techniques usable to preprocess the digital content 108 before encoding by the encoder 118. Examples of preprocessing techniques are represented by a filter module 212, edge detection module 214, de-interlace module 216, scale and color conversion module 218, image resizing module 220, and scene change detection module 222. The preprocessing module 210 is configured to select an amount or preprocessing performed on the digital content 108 as part of generating the preprocessed digital content 114.

The filter module 212, for instance, implements a noise filter 224 that is used to filter noise from the digital content, e.g., digital images, digital audio, and so forth. In an example, the noise filter 224 is a Gaussian filter having an impulse response that is an approximation of a Gaussian function. The Gaussian filter, for instance, modifies an input signal (e.g., the digital content 108) by convolution thereby "smoothing" the signal and therefore the data forming the digital content 108. Thus, in this example the amount of filtering employed adjusts an amount of smoothing applied to the digital content 108.

Similar control is also implemented by the preprocessing module 210 for other preprocessing techniques to control an amount of preprocessing performed based on the target bitrate 116, such as to control an amount of edge detection for the edge detection module 214, interlacing for the de-interlace module 216, scaling and color conversion of the scale and color conversion module 218, resizing (e.g., resolution) by the image resizing module 220, scene change sensitivity by the scene change detection module 222, and so forth. In these examples, the amount of preprocessing is decreased responsive to increases in the target bitrate 116 and vice versa. The preprocessing module 210, for instance, is configured to dynamically adjust to changes in the target bitrate 116 in real time to control amounts of processing performed in generating the preprocessed digital content 114 as further described in relation to FIG. 5. Other examples are also contemplated, such as to increase the amount of preprocessing performed responsive to decreases in a target bitrate 116 and vice versa.

The preprocessed digital content 114 is then passed to an encoder 118, which is encoded to form the encoded digital content 110. In the illustrated example, the encoded digital content 110 is communicated to a digital content sink 106 that employs a decoder 226 to decode the encoded digital content 110, e.g., for rendering by a rendering module 228, storage to memory by an archive module 230, communication by a communication module 232, and so forth. The encoder 118 and decoder 226, for instance, are configured to support a variety of video encoding formats (e.g., MP4), video codecs (H.264), audio formats (e.g., MP3, Dolby® Atmos), digital rights management (e.g., Google® WideVine, Microsoft® PlayReady, Adobe® Flash Access, Apple® Fairplay), adaptive bitrate video formats, and so forth.

Figure 3:
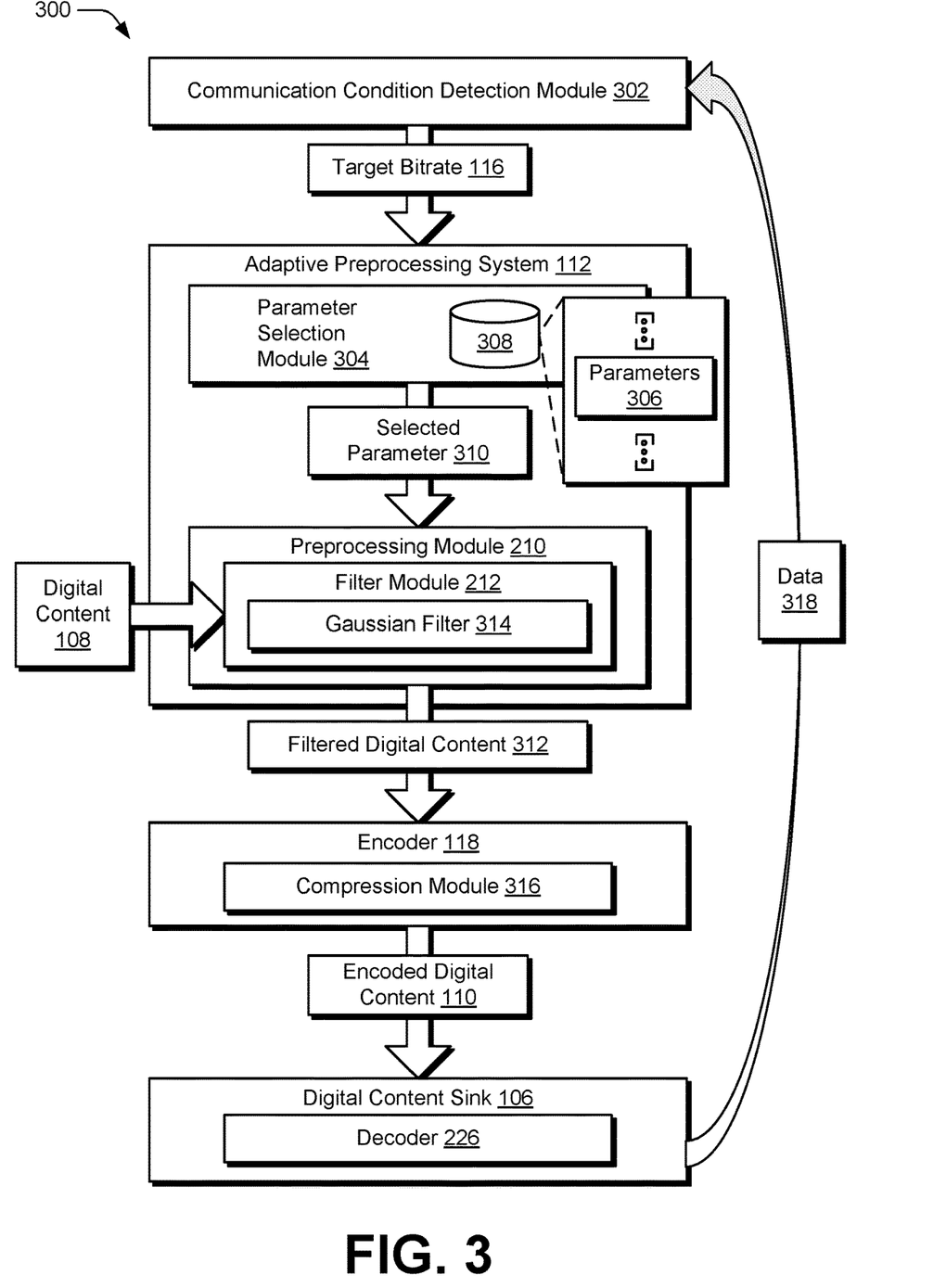
FIG. 3 depicts a non-limiting example showing operation of a digital content source, content pipeline, and digital content sink of FIG. 1 in greater detail in a noise filtering and compression encoding scenario involving network communication.

FIG. 3 depicts a non-limiting example 300 showing operation of the digital content source 102, content pipeline 104, and digital content sink 106 in greater detail in a noise filtering and compression encoding scenario involving network communication. A communication condition detection module 302 is configured to detect network conditions, and from this, set a target bitrate 116. The communication condition detection module 302, for instance detects available bandwidth, an amount of noise, signal strength, interference, transmission errors, data losses, missed packets, and so forth. Other examples are also contemplated, such as available buffer size, and so forth. This is detectable directly as described in the previous examples, detectable indirectly through access of a network API, determinable through emulation, and so forth. Based on the network conditions, the communication condition detection module 302 determines a target bitrate 116 that is usable to communicate the digital content in this example, e.g., in order to optimize quality by minimizing a likelihood of errors.

The target bitrate 116 is received as an input by the adaptive preprocessing system 112. A parameter selection module 304 is employed by the system to select a parameter from a plurality of parameters 306 maintained in memory 308 to control preprocessing operations based on the target bitrate 116, which is output as a selected parameter 310. The plurality of parameters 306, for instance, are calculated through testing and stored for increased efficiency at runtime. Other instances are also contemplated, including calculation of the selected parameter 310 at runtime.

The preprocessing module 210 in the illustrated example includes a filter module 212 that implements a Gaussian filter, an edge preserving filter, a perceptual filter 314 as previously described. Therefore, the selected parameter 310 specifies an amount of filtering employed by the filter module 212 to remove noise from the digital content 108. Accordingly, the selected parameter 310 is used to set this amount by the Gaussian filter 314, which is then used to form the filtered digital content 312. Other examples of filters are also contemplated, such as low pass filters, low pass filter, edge preserving low pass filter, perceptual low pass filter, and so on.

The filtered digital content 312 (which is representative of preprocessed digital content in this example) is passed to the encoder 118 to generate the encoded digital content 110. As described above, the encoder 118 is usable to encode the filtered digital content 312 in a variety of ways, the illustrated example of which involves compression using a compression module 316. A variety of compression techniques are usable, examples of which include discrete cosine transform (DCT) or motion compensation such as motion-compensated DCT video coding as used in H.26x and MPEG formats. The encoded digital content 110 is communicated to a digital content sink 106 that employs a complementary decoder 226 to decode the content, e.g., for rendering by corresponding output devices. Data 318 describing this communication is provided as feedback to the communication condition detection module 302 to control subsequent preprocessing and encoding, e.g., as indicative of network conditions.

Figure 4:
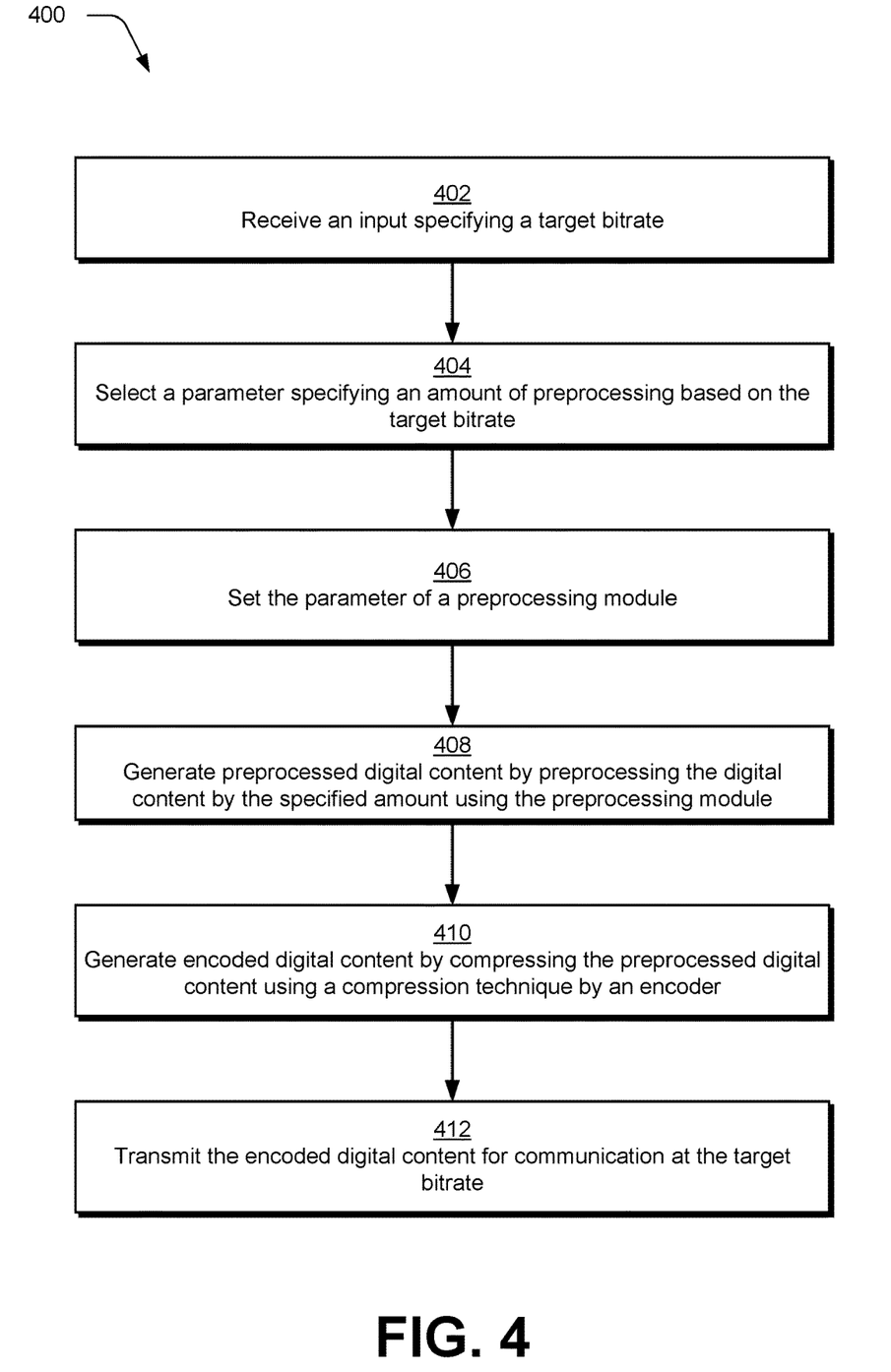
FIG. 4 depicts a procedure in a non-limiting example implementation of adaptive digital content preprocessing based on bitrate that involves compression.

FIG. 4 depicts a procedure 400 in an example implementation of adaptive digital content preprocessing based on bitrate that involves compression.

An input is received specifying a target bitrate (block 402). By way of example, an adaptive preprocessing system 112 receives as an input a target bitrate 116 from a communication condition detection module 302. The target bitrate 116, for instance, is set based on network conditions detected between a producer and consumer that implement the adaptive preprocessing system 112 and the digital content sink 106.

A parameter is selected specifying an amount of preprocessing based on the target bitrate (block 404). By way of example, the parameter is selected from a plurality of parameters 306 precomputed for corresponding bitrates. In another example, the parameter is selected through calculation in real time as the target bitrate 116 is received, e.g., based on a curve plotting target bitrate versus corresponding preprocessing parameters.

The parameter of a preprocessing module is set (block 406). By way of example, the selected parameter 310 corresponds to a type of preprocessing and thus setting the parameter configures the preprocessing module 210 to perform a corresponding amount of preprocessing.

Preprocessed digital content is generated by preprocessing the digital content by the specified amount using the preprocessing module (block 408). By way of example, the preprocessing module 210 preprocesses the digital content 108 by the amount set via the selected parameter 310. A variety of types or preprocessing are contemplated, examples of which are represented by a filter module 212, edge detection module 214, de-interlace module 216, scale and color conversion module 218, image resizing module 220, and scene change detection module 222.

Encoded digital content is generated by compressing the preprocessed digital content using a compression technique by an encoder (block 410). By way of example, the encoder 118 includes a compression module 316 to compress the preprocessed digital content. Other examples of encoding are also contemplated as described above.

The encoded digital content is transmitted for communication at the target bitrate (block 412). By way of example, the encoded digital content 110 is communicated as a bitstream at the target bitrate 116 over a network connection to the digital content sink 106.

Figure 5:
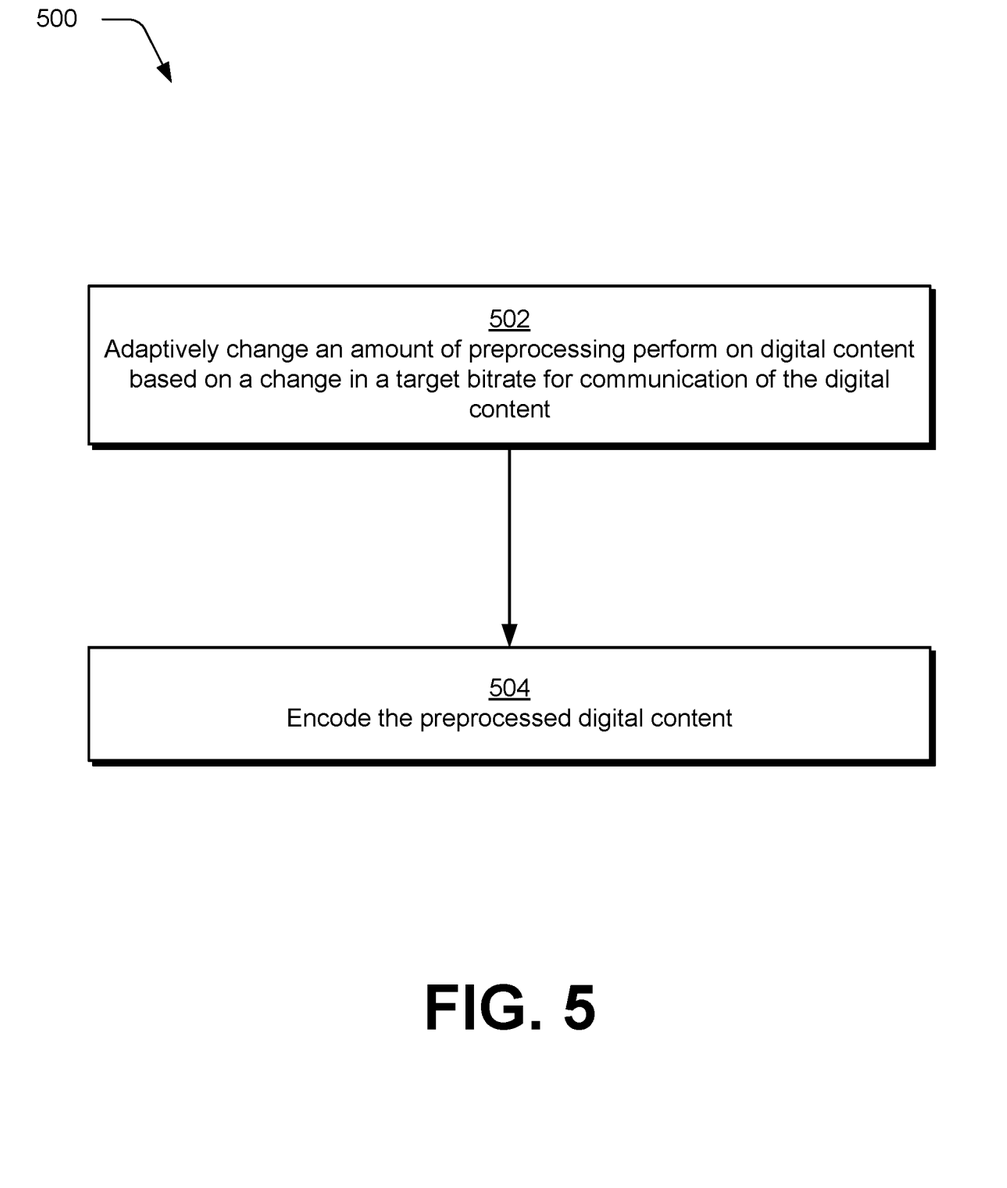
FIG. 5 depicts a procedure in a non-limiting example implementation of adaptive digital content processing based on changes in a target bitrate.

FIG. 5 depicts a procedure 500 in an example implementation of adaptive digital content processing based on changes in a target bitrate.

An amount of preprocessing performed on digital content is adaptively changed based on a change in a target bitrate for communication of the digital content (block 502). By way of example, a communication condition detection module 302 detects changes in network conditions and therefore changes the target bitrate 116 based on this detection. Therefore, the preprocessing module 210 is configured to respond to changes in the target bitrate 116 through corresponding changes in the parameters used to specify an amount of preprocessing.

The preprocessed digital content is encoded (block 504). By way of example, the encoder 118 compresses the digital content. Other types of encoding are also contemplated.

Figure 6:
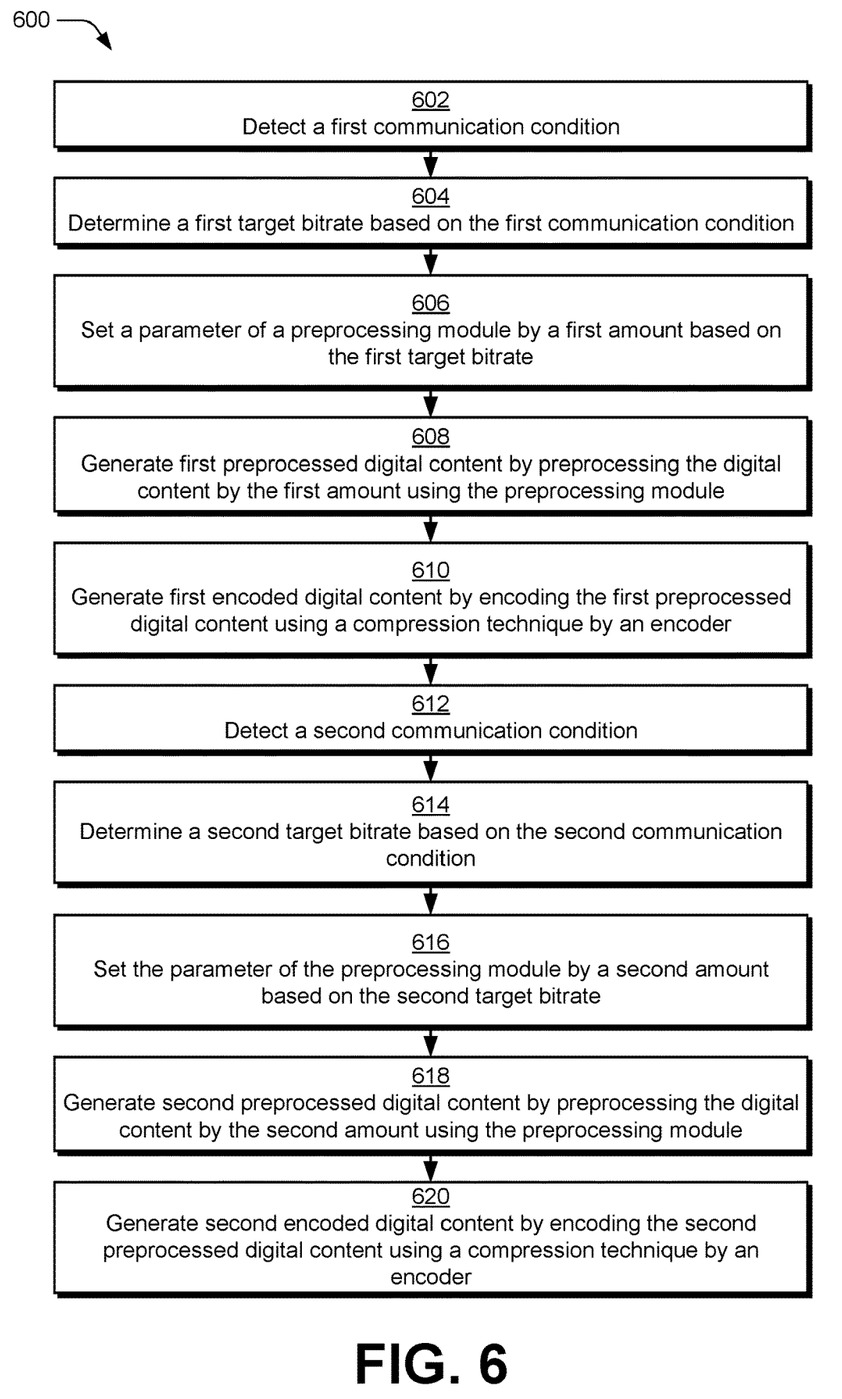
FIG. 6 depicts a procedure in a non-limiting example implementation of adaptive digital content processing based on first and second communication conditions.

FIG. 6 depicts a procedure 600 in an example implementation of adaptive digital content processing based on first and second communication conditions.

A first communication condition is detected (block 602). By way of example, communication condition detection module 302 detects available bandwidth, an amount of noise, signal strength, interference, transmission errors, data losses, missed packets, and so forth. Other examples are also contemplated, such as available buffer size, and so forth.

A first target bitrate is determined based on the first communication condition (block 604). By way of example, a parameter selection module 304 selects the selected parameter 310 from a plurality of precomputed parameters 306 maintained in storage. In another example, the selected parameter 310 is computed at runtime as previously describe.

A parameter of a processing module is set by a first amount based on the first target bitrate (block 606). By way of example, the selected parameter 310 set a corresponding amount of preprocessing to be performed by a preprocessing module 210.

First preprocessed digital content is generated by preprocessing the digital content by the first amount using the preprocessing module (block 608). By way of example, the preprocessing module 210 employs a filter module 212 to filter the digital content 108 by the first amount as specified by a selected parameter 310.

First encoded digital content is generated by encoding the first preprocessed digital content using a compression technique by an encoder (block 610). By way of example, the encoder 118 then encodes the filtered digital content 312.

A second communication condition is detected (block 612). By way of example, the second communication condition is different than the first communication condition.

A second target bitrate is determined based on the second communication condition (block 614). By way of example, the second target bitrate is greater than the first target bitrate. In another example, the second target bitrate is less than the first target bitrate.

A parameter of a processing module is set by a second amount based on the second target bitrate (block 616). By way of example, the second amount set for the parameter is different than the first amount set for the parameter, e.g., to increase or decrease an amount of filtering performed by the filter module 212.

Second preprocessed digital content is generated by preprocessing the digital content by the second amount using the preprocessing module (block 618). By way of example, this processing adapts in real time as changes are to be made to a bitstream of the digital content 108.

Second encoded digital content is generated by encoding the second preprocessed digital content using a compression technique by an encoder (block 620). By way of example, this encoding involves compression although other examples are also contemplated as described above.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the digital content source 102, content pipeline 104, and digital content sink 106) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
responsive to detecting a change to one or more communication conditions, setting a parameter for preprocessing circuitry based on a target bitrate;
causing the preprocessing circuitry to preprocess digital content based on the parameter to produce preprocessed digital content, the preprocessing including:
filtering the digital content based on a filtering strength associated with the parameter;
performing image resizing for the digital content based on a resolution associated with the parameter; and
performing scene change detection for the digital content based on a scene change sensitivity associated with the parameter;
causing an encoder to generate encoded digital content by compressing the preprocessed digital content using a compression technique; and
outputting the encoded digital content for communication at the target bitrate.

2. The method of claim 1, wherein the filtering includes use of one or more of Gaussian filtering, low pass filters, a low pass filter, an edge preserving low pass filter, or a perceptual low pass filter.

3. The method as described in claim 1, wherein the filtering includes removing noise from the digital content.

4. The method of claim 1, wherein the digital content includes a plurality of digital images as part of a digital video.

5. The method of claim 1, wherein the digital content includes digital audio.

6. A system comprising:
memory to store digital content;
preprocessing circuitry configured to:
preprocess the digital content based on a parameter to produce preprocessed digital content, the parameter having been set based on a target bitrate and responsive to detecting a change to one or more communication conditions, and the preprocessing including:
filtering the digital content based on a filtering strength associated with the parameter;
performing image resizing for the digital content based on a resolution associated with the parameter; and
performing scene change detection for the digital content based on a scene change sensitivity associated with the parameter; and
an encoder configured to:
generate encoded digital content by compressing the preprocessed digital content using a compression technique; and
output the encoded digital content for communication at the target bitrate.

7. An apparatus comprising:
a processor comprising:
preprocessing circuitry configured to preprocess digital content based on a parameter to produce preprocessed digital content, the parameter having been set based on a target bitrate and responsive to detecting a change to one or more communication conditions, the preprocessing including:
  filtering the digital content based on a filtering strength associated with the parameter;
  performing image resizing for the digital content based on a resolution associated with the parameter; and
  performing scene change detection for the digital content based on a scene change sensitivity associated with the parameter; and
an encoder configured to output encoded digital content for communication over a network connection at the target bitrate, and the preprocessed digital content having been compressed by the encoder using a compression technique to produce the encoded digital content.

8. The method of claim 1, wherein the parameter is dynamically adjusted in real time as the one or more communication conditions change.

9. The method of claim 8, wherein the parameter is selected from a plurality of precomputed parameters maintained in memory.

10. The system of claim 6, wherein the preprocessing circuitry is further configured to dynamically adjust the parameter in real time.

11. The system of claim 10, wherein the parameter is selected from a plurality of precomputed parameters maintained in the memory.

12. The system of claim 6, wherein the filtering includes use of one or more of Gaussian filtering, low pass filters, a low pass filter, an edge preserving low pass filter, or a perceptual low pass filter.

13. The apparatus of claim 7, wherein the preprocessing circuitry is further configured to dynamically adjust the parameter in real time as the one or more communication conditions change.

14. The apparatus of claim 13, wherein the parameter is selected from a plurality of precomputed parameters maintained in memory.

15. The apparatus of claim 7, wherein the filtering includes use of one or more of Gaussian filtering, low pass filters, a low pass filter, an edge preserving low pass filter, or a perceptual low pass filter.

16. The method of claim 1, further comprising:
  adjusting the parameter responsive to detecting a further change to the one or more communication conditions; and
  based on the adjusted parameter, adjusting at least one of an amount the digital content is filtered, an amount the image resizing is performed, and an amount the scene change detection is performed.

17. The method of claim 1, wherein the parameter is determined based on a curve plotting target bitrates versus corresponding preprocessing parameter values.

18. The system of claim 6, wherein the parameter is determined based on a curve plotting target bitrates versus corresponding preprocessing parameter values.

19. The apparatus of claim 7, wherein the parameter is determined based on a curve plotting target bitrates versus corresponding preprocessing parameter values.

20. The apparatus of claim 7, further comprising communication circuitry configured to transmit the encoded digital content at the target bitrate and dynamically adjust the target bitrate in response to detecting the change to the one or more communication conditions.

* * * * *